F. T. HAGUE.
SYNCHRONOUS BOOSTER ROTARY CONVERTER.
APPLICATION FILED NOV. 12, 1915.

1,250,164.

Patented Dec. 18, 1917.

WITNESSES:
R. J. Fitzgerald.
D. C. Davis.

INVENTOR
Floyd T. Hague.
BY
Wesley G. Carr
ATTORNEY

UNITED STATES PATENT OFFICE.

FLOYD T. HAGUE, OF PITTSBURGH, PENNSYLVANIA, ASSIGNOR TO WESTINGHOUSE ELECTRIC AND MANUFACTURING COMPANY, A CORPORATION OF PENNSYLVANIA.

SYNCHRONOUS BOOSTER ROTARY CONVERTER.

1,250,164.

Specification of Letters Patent.

Patented Dec. 18, 1917.

Application filed November 12, 1915. Serial No. 61,059.

*To all whom it may concern:*

Be it known that I, FLOYD T. HAGUE, a citizen of the United States, and a resident of Pittsburgh, in the county of Allegheny and State of Pennsylvania, have invented a new and useful Improvement in Synchronous Booster Rotary Converters, of which the following is a specification.

My invention relates to synchronous booster rotary converters and to allied forms of dynamo-electric machinery, and it has for its object to provide means for the exact regulation of the commutating field in order to provide effective commutation under all conditions of load.

Figure 1:
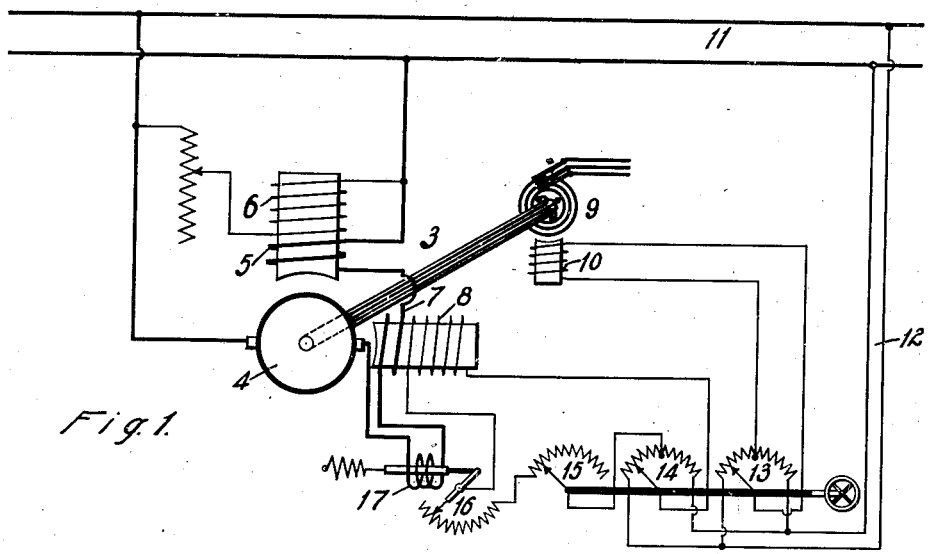
Figure 2:
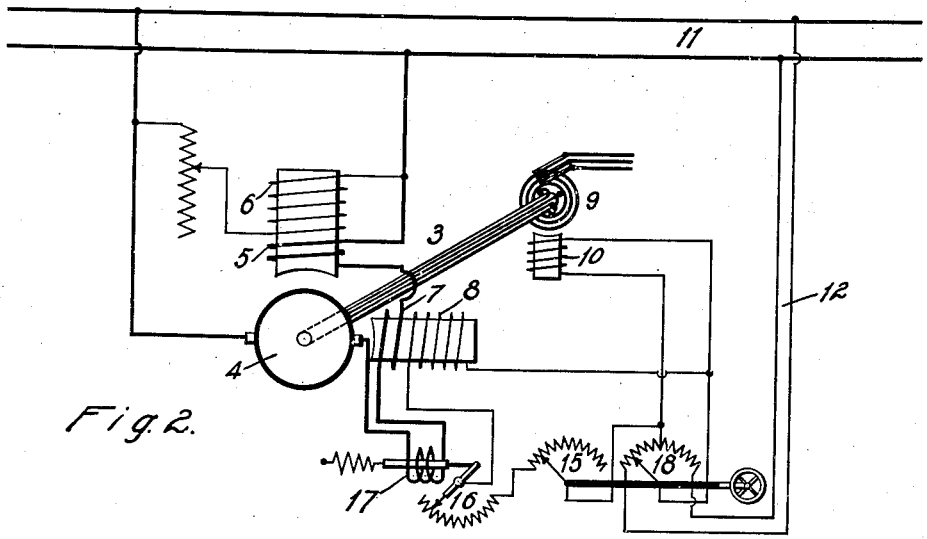

In the accompanying drawing, Figure 1 is a diagrammatic view of a synchronous booster rotary converter, together with its attendant supply, load and field circuits, illustrating a preferred form of my invention; and Fig. 2 is a diagrammatic view of a modification of the system shown in Fig. 1.

In the operation of synchronous booster rotary converters wherein an alternating current booster machine is mechanically coupled and electrically connected in series relation with a rotary converter, the booster machine operates as a generator when boosting, deriving torque from the rotary-converter armature and developing motor-armature reaction under the brushes thereof. In like manner, when bucking, the booster machine operates as a motor and transmits torque to the converter armature, producing generator reaction under the brushes thereof. In order to produce the proper commutating field for sparkless operation under these conditions, it has been proposed to provide means for simultaneously varying the excitation of the booster field windings and of a commutating winding on the rotary converter, as, for example, by coupled rheostats, as described in a copending application of J. L. McK. Yardley, Serial No. 757,359, filed March 28, 1913, and assigned to the Westinghouse Electric & Manufacturing Company. In the system set forth in the above-mentioned application, the exciting current for both the booster field windings and for the rotary commutating field windings is derived from the direct-current end of the rotary converter, and said commutating winding is therefore excited from a much higher-voltage source at maximum boost than at maximum buck, machines of this character generally being designed for substantially 30% voltage variation. This is an undesirable condition because the motor-armature reaction, at a definite load and a certain degree of boost, is substantially the same as the generator reaction, at a like load and like degree of buck. The commutating field excitation should therefore be the same for corresponding degrees of buck and boost and should be rendered independent of voltage changes at the direct-current end of the machine.

By my invention, I insert a rheostat in series with the commutating-field winding and mechanically couple said rheostat to the booster field rheostat and I so adjust said commutating-field rheostat that, as the voltage of the mains is increased by the adjustment of the booster, resistance is inserted in the field circuit, and the current in the commutating field winding is thus rendered independent of changes in the voltage of the mains.

For a more detailed understanding of my invention, reference may be had to the drawing wherein I show a synchronous booster rotary converter at 3 in Fig. 1, said converter embodying a rotary-converter armature 4 of ordinary construction provided with main series and shunt field windings 5 and 6, respectively; with series and shunt commutating windings 7 and 8; and an alternating-current booster machine 9 mechanically and electrically associated therewith and provided with a field winding 10. The converter armature 4 delivers direct current to suitable mains 11, and exciting current derived from said mains is supplied by wires 12 to adjustable reversible rheostats 13 and 14 which are mechanically coupled for simultaneous operation, as indicated. Thus, when it is desired to reverse the action of the booster machine 9, the direction of current in the field winding 10 is reversed and suitably adjusted by the rheostat 13 and, at the same time, the direction and strength of the current supplied to the commutating field winding 8 of the rotary converter is altered in like manner by the rheostat 14. Rheostats 15 and 16 are connected in series with the field winding 8, the rheostat 15 being mechanically coupled to the rheostats 13 and 14 and the rheostat 16 being subject to the control of the load current by a suitable solenoid 17. The connections are such that, when the contact-making arms of the rheostats 13 and 14 are turned to the extreme left, the machine 9 is at maximum buck, minimum voltage is supplied to the mains 11, and all of the rheostat 15 is eliminated from the commutating-field circuit. As the contact-making arms of the rheostats 13 and 14 are swung to the right, the amount of buck of the machine 9 is gradually reduced, raising the voltage supplied by the armature 4 and, simultaneously with said action, a continually increasing amount of the rheostat 15 is cut into circuit, neutralizing the effect of the rise in voltage across the mains 11 upon the excitation of the winding 8. Said action is continued as the contact-making arms of the rheostats 13 and 14 pass the mid-point, producing a constantly increasing degree of boost.

I find that it is unnecessary to employ two separate rheostats 13 and 14 for the control of the current in the field windings 8 and 10, the functions of two reversible rheostats being readily performed by a single reversing rheostat from which said two field windings are energized in parallel relation with each other. A system of this character is shown in Fig. 2 which is, in all respects, similar to Fig. 1 with the exception that a single reversing rheostat 18 is provided and the field windings 8 and 10 are operated in parallel therefrom, the compensating or neutralizing rheostat 15 being inserted in series with only the field winding 8.

While I have described my invention in its preferred forms, it is not so limited but is susceptible of various minor changes and modifications within the scope of the appended claims.

I claim as my invention:

1. The combination with a dynamo-electric machine supplying direct current, of a booster machine in series therewith for adjusting the voltage supplied to the terminals thereof, means for varying the voltage supplied by said booster for adjusting the voltage of said terminals, a field winding for said main machine excited from said terminals, and means arranged for simultaneous operation with said booster voltage-adjusting means for varying the resistance of said field circuit and neutralizing the effects of voltage changes between said terminals on the field current.

2. The combination with a dynamo-electric machine supplying direct current, of a booster machine in series therewith for adjusting the voltage supplied to the terminals thereof, a reversible rheostat for adjusting the voltage supplied by said booster to assist or oppose the voltage of said main machine for the adjustment of the voltage supplied to said terminals, a commutating field winding for said main machine excited from said terminals, and an adjustable rheostat in circuit with said commutating winding and coupled to said booster-field rheostat, whereby the tendency of alterations in the voltage across the terminals to alter the current in said commutating field winding is neutralized.

3. The combination with a dynamo-electric machine supplying direct current, of a booster machine in series therewith for adjusting the voltage supplied to the terminals thereof, a reversible rheostat for adjusting the voltage supplied by said booster to assist or oppose the voltage of said main machine for the adjustment of the voltage supplied to said terminals, a commutating field winding for said main machine excited from said terminals, an adjustable rheostat in said field circuit and coupled to said booster field rheostat, whereby the tendency of alterations in the voltage across the mains to alter the current in said commutating field winding is neutralized, and means for varying the resistance of said commutating field circuit in accordance with the load on said main machine.

4. The combination with a rotary converter, of a synchronous alternating-current booster mechanically connected thereto and electrically in series therewith, an adjustable field rheostat for said booster for causing the voltage thereof to assist or oppose the voltage of the main machine through a wide range, a commutating field winding for the main machine excited from the direct current end of said rotary converter, and an adjustable rheostat in circuit with said commutating field winding and arranged to move with said booster field rheostat, whereby the tendency of changes in the direct-current voltage to alter the excitation of said commutating field winding is neutralized.

In testimony whereof, I have hereunto subscribed my name this 26th day of Oct., 1915.

FLOYD T. HAGUE.